Patented June 10, 1924.

1,496,932

UNITED STATES PATENT OFFICE.

ALEXANDRE GROSS, OF PARIS, FRANCE.

PROCESS FOR THE PREPARATION OF COFFEE.

No Drawing.   Application filed December 10, 1921.   Serial No. 521,420.

*To all whom it may concern:*

Be it known that I, ALEXANDRE GROSS, citizen of the French Republic, residing at Paris, Department of the Seine, in France, and having P. O. address 15 Rue Spontini, in the said city, have invented certain new and useful Improvements in Processes for the Preparation of Coffee; and I do hereby declare the following to be a full, clear, and exact description of the invention, such as will enable others skilled in the art to which it appertains to make and use the same.

This invention relates to the various processes at present used for the preparation of coffee, and its object is to correct certain defects of the existing processes and to obtain a roasted coffee of perfect quality which constitutes a new product.

Green coffee received from the various producing countries, has generally to undergo various treatments before roasting, chiefly consisting in removing from it the numerous impurities of various kinds contained in it such as damaged beans, bits of wood, etc. After these operations, the coffee is roasted in well known apparatus; the object of the invention is chiefly not to roast the coffee until after it has been subjected to a preliminary operation described in the following.

The whole of the process comprises therefore well known operations and new operations which may be classified as follows:

1st operation: Cleaning of green coffee by means of a winnower or separating screen removing foreign matters and damaged beans.

2nd operation: An almost complete drying of the green coffee in a hot air kiln, this operation being a characteristic feature of the invention.

3rd operation: Elimination of the pulp from the green coffee by means of a winnower (this operation is the consequence of the second one).

4th operation: Roasting of green coffee by standard slow or rapid roasting apparatus.

The process comprises therefore a new operation which consists in removing from the green coffee by evaporation any moisture which it contains before roasting, the proportion of the said moisture varying from 12 to 15%. This new operation does not take more than 10 minutes at the outside and is carried out at a temperature of 60 to 70° in hot air kilns of well known type which do not offer any special features; for instance kilns similar to those used for drying haricot beans.

The roasting operation at present carried out in rapid apparatus, is generally very violent; and the roasting in such a case carries away a fairly large quantity of the essential aromatic oils.

With the process according to the invention, the drying of coffee at the temperature of 60–70° makes it possible to obtain an almost complete drying of the green coffee without a rapid evaporation, and the essential aromatic oils are not carried away, but concentrated.

One of the advantages of the process consists moreover in the possibility of very easily removing from the green coffee the skin which covers each bean; in fact the said skin hardened by the drying, is easily detached in the exhausting winnower which can be used for this operation.

The roasting apparatus receives therefore finally a dry coffee deprived of all its natural or accidental impurities, and the coffee supplied for consumption, has a concentrated aroma and a perfect flavour and constitutes thereby a new product.

Claims—

1. The method of treating coffee which comprises subjecting the green beans to the action of hot dry air for a period of time and at a temperature sufficient to free them of moisture without volatilizing or impairing the essential oils therein, freeing the dried beans of pulp, skins and other undesirable elements, and finally roasting the dried and cleaned beans.

2. The method of treating coffee which comprises drying the green beans by subjecting them to dry air at a temperature of from 60° to 70° C., for a period of time not exceeding ten minutes, freeing the dried beans of pulp, skins and other undesirable elements, and finally roasting the dried and cleaned beans.

In testimony whereof I affix my signature.

ALEXANDRE GROSS.